Oct. 27, 1953  E. J. HOUDRY  2,656,830
INTERNAL-COMBUSTION ENGINE
Filed March 19, 1951  2 Sheets-Sheet 1

INVENTOR.
EUGENE J. HOUDRY
BY
Ira L. Nickerson
ATTORNEY

Oct. 27, 1953 E. J. HOUDRY 2,656,830
INTERNAL-COMBUSTION ENGINE
Filed March 19, 1951 2 Sheets-Sheet 2

INVENTOR.
EUGENE J. HOUDRY
BY
Ira L. Nickerson
ATTORNEY

Patented Oct. 27, 1953

2,656,830

UNITED STATES PATENT OFFICE 2,656,830

INTERNAL-COMBUSTION ENGINE

Eugene J. Houdry, Ardmore, Pa.

Application March 19, 1951, Serial No. 216,347

8 Claims. (Cl. 123—191)

1

This invention relates to internal combustion engines and to ways and means for improving the operation and the efficiency of the same. More particularly it has to do with the combustion of the motive fuel and to minimizing the importance of the knock rating of fuels, especially of those in the gasoline boiling range. In certain respects it may be considered as a further development of or improvement on the invention set forth in my copending U. S. application Serial No. 790,216 filed December 6, 1947, now Patent No. 2,552,555.

Among the objects of the invention are to adapt internal combustion engines readily and easily to operate on low octane fuel, to provide practical and relatively inexpensive devices and apparatus for effecting partial oxidation of fuel by catalytic means thereby to permit the use of low octane fuel without sacrifice of engine efficiency, to permit convenient adjustment of the catalyst for maximum efficiency as well as for inspection and/or replacement of the catalytic means, and to adapt all engines regardless of age to utilize partial catalytic oxidation of fuel at minimum expense for new parts. Other objects will be apparent from the detailed description which follows.

In accordance with the invention the oxidizing catalysts for partial oxidation of fuel and for preventing detonation or knocking are mounted on one or more plugs, similar in certain respects to spark plugs and like the latter arranged to be threaded or otherwise secured in suitable openings therefore in the engine walls for convenient insertion and removable without dismantling any parts of the engine. When such plugs are in place they dispose the oxidation catalysts carried thereby at suitable locations with reference to the combustion chamber and so as to extend into or to communicate with the latter. The plugs may take a variety of forms but in most instances it is desirable to provide for adjustment of the extent of projection of the catalyst within the combustion chamber of the engine. By preference the location of the plugs is at or adjacent the periphery of the piston chamber and at one or more points remote from the locus of spark ignition of each cylinder. Conversion of an engine in most instances involves merely the substitution for the old cylinder head of a new head adapted to utilize catalytic plugs in addition to conventional spark plugs.

In order to illustrate the invention and the manner of its use, concrete embodiments thereof are shown in the accompanying drawings in which:

Fig. 1 is a top plan view, somewhat diagrammatic, of a six cylinder internal combustion engine;

2

Figure 1:
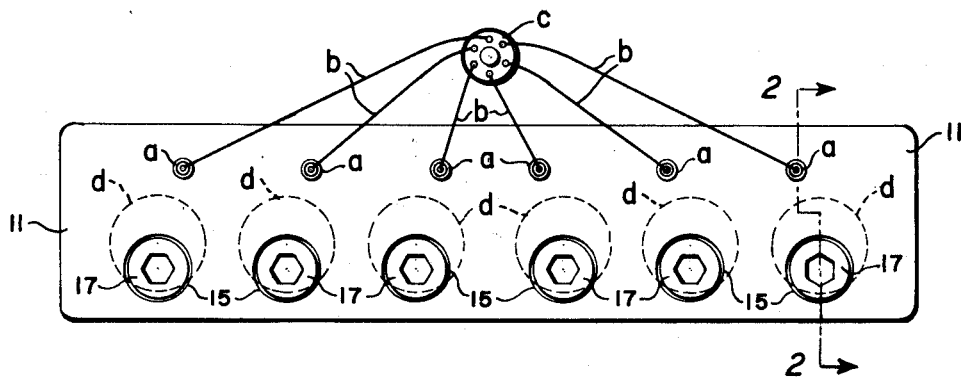
Figure 2:
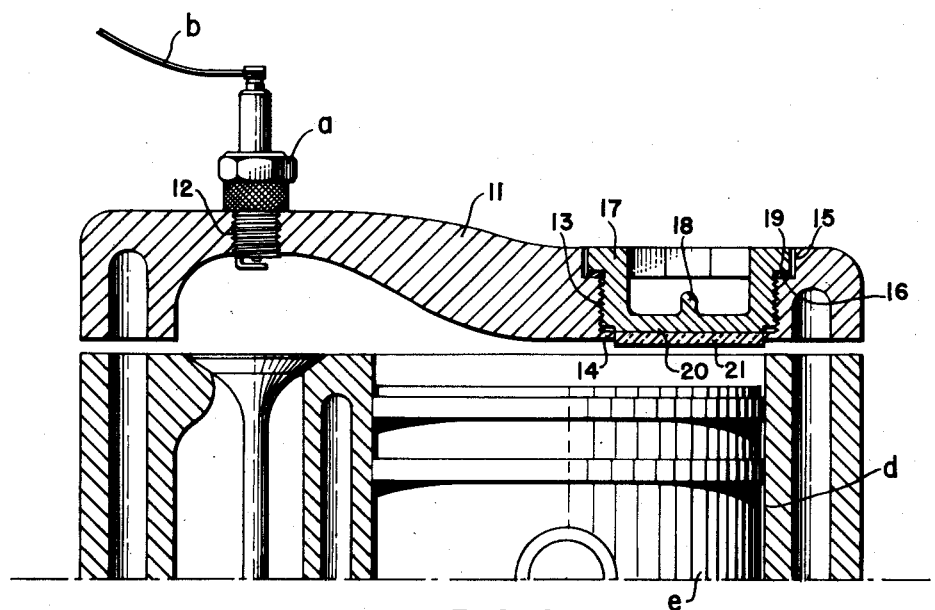
Fig. 2 is a partial transverse sectional view on an enlarged scale on the broken line 2—2 of Fig. 1.

In Figs. 1 and 2 an internal combustion engine is shown having a cylinder head 11 which is provided along one side with a series of threaded openings 12, in which are mounted spark plugs $a$, one spark plug for each cylinder, the spark plugs being connected by wiring $b$, to a suitable distributor $c$, for providing spark ignition to each of the cylinders $d$ of the engine to effect reciprocation of pistons $e$ (Fig. 2). Cylinder head 11 is also provided along the other side thereof with a series of somewhat larger threaded openings 13 above pistons $e$, one such opening 13 for each cylinder and substantially on or near the inner periphery of each cylinder and at a location remote from its spark plug $a$. As shown in Fig. 2, the threaded portion of opening 13 does not extend entirely through the cylinder head but ends above a narrow annular shoulder 14, while the upper portion of each such opening is counter-bored at 15 to provide an annular shoulder 16.

Figures 3, 4:
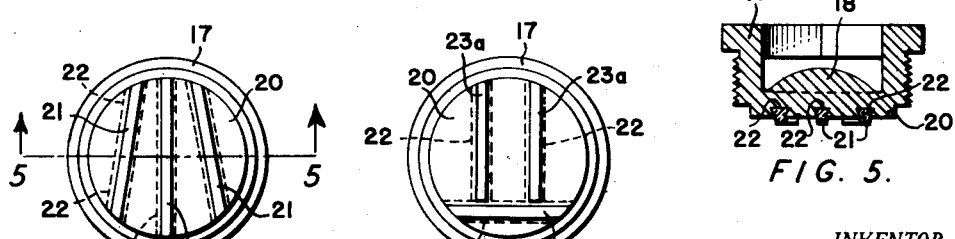
Fig. 3 is a bottom plan view of the catalytic plug shown in Fig. 2.
Fig. 4 is a bottom plan view of another catalytic plug showing a modified arrangement of the catalytic elements.
Figure 5:
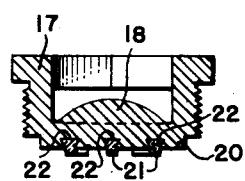
Fig. 5 is a sectional view on the line 5—5 of Fig. 3.

Into each of the openings 13 is threaded a catalytic plug 17 which is cup shaped in form and which may be provided with one or more ridges or ribs 18 (Figs. 2 and 5) extending upwardly from the lower closed end of the plug to strengthen such portion against the upward thrust from the explosions of motive fluid in the combustion chamber of each cylinder. The upper inner portion of each plug 17 may be in square or hexagonal form to receive a wrench for screwing the plug into place, and this portion of the plug is preferably formed with an outwardly extending annular flange to be received in counterbore 15 and to engage a suitable gasket 19 seated on shoulder 16. The lower end of plug 17 has a cylindrical reduced portion 20 to extend beyond lower shoulder 14 (Fig. 2) so as to dispose its lower face substantially even with the adjacent wall of the combustion chamber when the catalytic plug is in place. In or upon this lower face of this reduced portion 20 are mounted suitable catalysts or catalytic means for oxidizing a portion of the fuel charged to each cylinder. As shown in Figs. 2, 3 and 5, such catalytic means take the form of elongate elements such as strips or slides 21 provided with laterally enlarged bases received in grooves 22 or corresponding shape in the bottom of each plug 17, such grooves having undercut sides as shown in order to hold the slides firmly in place. Those portions of slides 21 which project below the lower face of each plug 17 are of catalytic material or are coated with catalyst or will otherwise have suitable oxidizing catalysts mounted thereon. By preference elements or slides 21 are formed of ceramic material, especially of dense compact porcelaneous material of the general type used for the cores of spark plugs, which materials have been fired at high temperatures, as in the range of 2500 to 3900° F., to make them strong, stable and catalytically inert. To render such slides active for the desired oxidation reaction the slides will by preference first be coated with a suitable base film of active alumina (or alternatively of active magnesia, beryllia, or thoria) and then such base film will be impregnated with a small quantity of any known or suitable oxidizing catalyst, such as platinum, silver, copper, etc. Such catalytic structure and composition is characterized by sustained high activity and long life.

As shown in Figs. 2, 3 and 5, the strips or slides 21 having catalytic material thereon are three in number, the central strip extending across the center of projection 20 on the plug, while the two side strips 21 also extend across the bottom of the plug, but in directions diverging from the central strip. Fig. 4 shows another arrangement in which the same number of straight strips or slides for supporting oxidizing catalytic material are provided, but in this instance strips 23a are in parallel and of equal length on opposite sides of the central line across the bottom of the plug, and there is a shorter strip 23b extending crosswise or at right angles to strips 23a. In mounting the plugs of the type shown in Figs. 3, 4 and 5, the center strip 21 (or the parallel strips 23a) should extend in general radially of the cylinder, as shown in Fig. 2 or, in other words, should point toward the lower side of the cylinder head, as viewed in Fig. 1. Grooves or punch marks (not shown) may be made on the top of each plug 17 and on adjacent portions of the cylinder head, or other suitable means may be utilized to insure proper positioning of the catalytic strips 21, or 23a in the combustion chamber when the plug is screwed home, and gaskets 16 of differing thickness may be utilized to insure each plug 17 being tightly in place when the strips are properly positioned.

Figure 6:
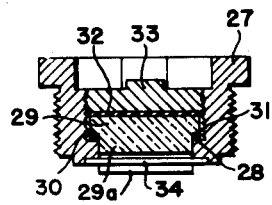
Figs. 6 and 7 are cross sectional views at right angles to each other of another modification of the catalytic plug for use in the engine of Figs. 1 and 2.
Figure 7:
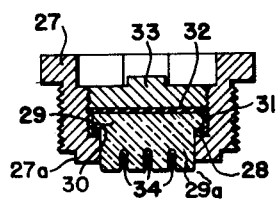

Figs. 6 and 7 show still another form of catalytic plug which may be substituted for plugs 17 of Figs. 1 to 5. Plug 27 of Figs. 6 and 7 is in the form of a cylindrical metallic shell threaded internally as well as externally, as shown, and provided internally with an annular stop shoulder 28. A core 29 of inert porcelaneous material, of the same general composition as that of the strips or slides 21 for the first form of the invention, is shaped to fit within the central bore of shell 27 and to have a reduced portion 29a with catalytic material thereon to extend through the open end of the shell and to provide a shoulder 30 on core 29 opposite stop shoulder 28. Between shoulders 28 and 30 are inserted one or more spacing members or gaskets 31 to provide for adjustment of the extent of projection of reduced portion 29a beyond the end of shell 27. Upon the top of core 29 is placed an insulating washer 32 of asbestos or other suitable material, against which a threaded plug 33 bears to secure core 29 in place. The lower reduced end 27a of shell 27 may have a series of rods 34 extending in parallelism across the open end of the shell, such rods being loosely received in grooves therefor in the projecting portion 29a of the catalytic core, so that such projecting portion takes the form of a series of ridges (Fig. 7). If desired, there may be additional rods (not shown) extending across the open end of shell 27 at right angles to rods 34, in which case the lower end of catalytic core 29 will have additional cross grooves forming projections such as those on a waffle grid. Rods 34 serve to distribute the heat of combustion of the fuel in the combustion chamber evenly across the plug 29 and also serve as safety means to prevent pieces of the core from falling into the combustion chamber in the event that the core should become cracked or broken.

Figure 8:
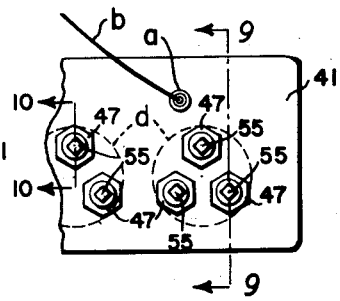
Fig. 8 is a fragmentary top plan view of the internal combustion engine of Fig. 1 showing a different cylinder head having several catalytic plugs for each cylinder, this view being on the scale of Fig. 1.
Figure 9:
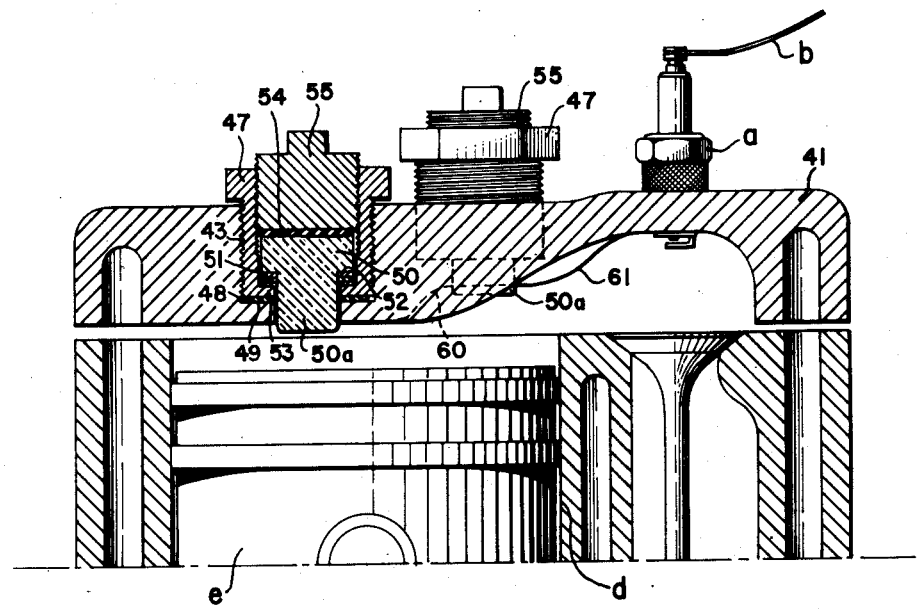
Fig. 9 is a partial transverse sectional view on an enlarged scale on line 9—9 of Fig. 8 showing one catalytic plug in section and another in elevation.

Figs. 8 and 9 show a fragmentary portion of the engine of Fig. 1 but equipped with a cylinder head 41 providing three threaded openings 43 per cylinder for catalytic plugs, in addition to a threaded opening for spark plug a. Openings 43 are of smaller size than threaded opening 13 of Figs. 1 and 2, and the catalytic plugs 47 fitting the same are also of smaller size but of the general construction of the form of plug shown in Fig. 6 and Fig. 7. The three plugs 47 are arranged around the periphery of each cylinder, as indicated in Fig. 8. Each plug comprises an annular shell 47 with an open lower end of reduced size. The lower portion of shell 47 is arranged to engage a suitable gasket 48, resting upon a shoulder 49 provided by cylinder head 41 at the lower end of the threaded portion of each opening 43. Within the shell 47 is the porcelaneous core 50 which is provided with a reduced lower end 50a for supporting catalytic material and adapted to project beyond the lower face of cylinder head 41 when the plug is in place. One or more spacing gaskets 51 are mounted between shoulder 52 on core 50 and the opposing shoulder 53 on shell 47, to permit adjustment of the extent of projection of core extension 50a into the combustion chamber of the engine. A washer of insulating material 54 rests upon the top of core 50, and a threaded plug 55 is screwed down upon washer 54 to retain core 50 in place.

Figure 10:
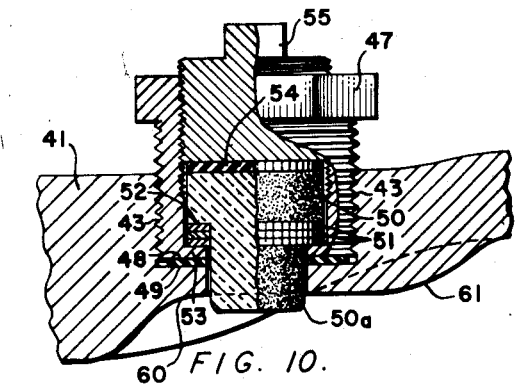
Fig. 10 is a fragmentary sectional view on the line 10—10 of Fig. 8 and on a somewhat larger scale than Fig. 9, the parts of the catalytic plug being shown in elevation, broken away and in section.

As shown in Figs. 9 and 10, catalytic plug 47 which is nearest to spark plug a, requires some modification in the contour of the lower wall of cylinder head 41 to permit the fluids in the piston chamber to have access to the lower or projecting end of catalytic core 50a as well as to provide adequate depth in the threaded opening 43 for the catalytic plug at such location. To this end a portion of the underface of cylinder head 41 is recessed upwardly, as at 60 (Figs. 9 and 10), while an adjacent portion 61 is correspondingly extended downwardly to present an adequate thickness of wall for the shoulder 49 against which the lower end of shell 47 of the catalytic plug seats when such plug is in place.

In operation the engine of Figs. 1 or 8 will start like a conventional engine with spark plug ignition and will continue to operate on spark plug ignition until the oxidizing catalyst on plugs 17, 27 or 47 becomes heated to operating temperature by the explosions of the motive fluid in the cylinders. Platinum catalysts come into operation at temperatures of the order of 550–600° F. Other oxidizing catalysts such as silver, copper, etc. operate at somewhat higher temperatures, as 800° F. or above. As soon as the catalytic plugs, or rather the catalyst on the lower ends thereof, such as the strips or slides 21, 23a, 23b or the core extensions 29a or 50a, reach operating temperature they begin to oxidize the motive fluid in contact therewith and do so in a continuous manner, as contrasted with the momentary ignition effected by spark plugs a. Thus as soon as the motive fluid is drawn into cylinder on the suction stroke of the piston and comes in contact with the catalytic surfaces of the catalytic plugs, flameless oxidation takes place and continues throughout the compression stroke, up to the moment of ignition by the spark plug and even thereafter on the power stroke, just so long as unoxidized fuel is in contact with the catalytic surfaces. The effect of the flameless oxidation of a portion of the motive fluid is to increase the volume of gases within the compression space of each cylinder and to raise the temperature of such gases, thus creating much the same effect as if the compression ratio were increased by mechanical modification of the engine. Moreover, the higher temperature caused by catalytic oxidation of a part of the fuel causes faster burning of the remainder when the latter is finally ignited by the spark plug, also more extensive flame propagation takes place toward the cold wall of the engine remote from the spark plug where the catalytic plug or plugs will normally be placed (see Figs. 1 and 8). The result is a more powerful power stroke due to increased compression and higher operating temperature. It is when the flame approaches the cold wall in the conventional engine htat heat and pressure usually combine to break down or crack the residual portions of fuel into knocking components and it is this portion of the fuel which the oxidizing catalysts on the catalytic plugs are designed and intended to transform by catalytic oxidation, with the result that most of the knocking components in the area are eliminated. Accordingly by utilizing the present invention motor fuels of low octane rating including straight run gasoline can be used in conventional engines, whether old or new, by the simple expedient of changing the cylinder head to one such as shown in Fig. 1 or Fig. 8, which provides for the convenient use of catalytic plugs of the type herein disclosed.

One large plug, of the type shown in Figs. 2 through 7, may be utilized, located by preference as indicated in Figs. 1 and 2 near the cold wall of the engine, or several smaller plugs of the type shown in Figs. 9 and 10 may be utilized. While five or six small plugs per cylinder are a possibility in a properly designed cylinder head, two or three such plugs as indicated in Figs. 8 and 9 are sufficient. When using active oxidation catalysts such as obtained from the platinum group, or silver, or copper, with such catalysts finely dispersed on an active base such as active alumina, magnesia, beryllia, or thoria, from .04 to .16 square inch (and usually about .08 square inch) of catalyst surface per cubic inch of piston displacement provides the necessary surface to oxidize catalytically sufficient of the motive fluid and also the knocking constituents of broken or cracked hydrocarbon molecules contained in the air-fuel mixture at the time of flame travel in the combustion chamber resulting from the spark ignition. For example, given a cylinder having a piston displacement of 50 cubic inches, some 4 square inches of catalytic surface is required. This area can be provided by a single large catalytic plug such as 17 or 27, or by three smaller catalytic plugs such as 47, each having approximately 1.33 square inches of catalytic surface.

The simplest form of plug is shown in Figs. 2 to 5 inclusive, in which the metallic portion is cup-shaped and in one piece, and the catalyst is attached thereto by porcelain slides fitting in grooves 22 in the underface of the one-piece plug. The slides 21, 23a or 23b are intended to fit tightly within the grooves 22 cut in the shallow cylindrical projection 20 on the bottom of the plug. By preference the slides are cemented in their grooves to insure their remaining in place, but since the grooves are cut in the shallow cylindrical extension 20 whose lower face is substantially flush or even with the upper surface of the combustion chamber formed by the cylinder head, it is impossible for the slides to work loose or fall into the combustion chamber. If it is found necessary to change the extent of projection of the slides into the combustion chamber, the plugs must be removed from the cylinder head, the slides forced out of the grooves and new slides of greater depth substituted.

In the forms of the plug shown in Figs. 6 through 10, change in the extent of projection of the catalyst is effected by changing the number or thickness of gaskets 31 (Figs. 6 and 7) or gaskets 51 (Figs. 9 and 10). The area of the catalytic surface may be increased by grooves and ridges in the porcelain core as indicated in Figs. 6 and 7, or by grooves at right angles to one another producing projections as in a waffle grid. The large porcelain core such as 29 of the plugs shown in Figs. 6 and 7, or the core 50 of the smaller plugs shown in Figs. 9 and 10, have the advantage of maintaining catalytic surfaces at operating temperature for a longer time than the relatively thin strips or slides 21, 23a and 23b of Figs. 2 to 5 inclusive which lose heat rather rapidly to the one-piece plug 17 of Figs. 1 through 5. The insulating washers 32 of Figs. 6 and 7, and 54 of Figs. 9 and 10, also assist in retaining heat in porcelain cores 29 and 50.

Engines are easily adapted to utilize the catalytic plugs by the simple expedient of a new cylinder head. The number and size of the catalytic plug openings may be readily determined from the piston displacement of the engine cylinder and since all the catalytic plugs shown herein have provision for the adjustment of the extent of projection of the catalytic surface within the combustion chamber, it requires nothing more than simple experimentation to adjust the engine to best performance. With proper adjustment of the amount and disposition of the catalytic surfaces, engine performance with low octane fuels can be obtained equaling and in many instances exceeding performance with higher octane fuels when the engine is not equipped with the catalytic plugs. An important advantage of the use of the catalytic plugs is the obtaining of what amounts to an increase in compression ratio by the expedient of effecting flameless oxidation of a portion of the motive fluid and without structural changes in the engine. Moreover, combustion efficiency is improved and carbon deposits in the combustion chamber are greatly reduced if not completely eliminated. The catalytic plugs are quickly and easily removed for inspection or cleaning, and renewal or replacement of the catalytic portions thereof when required is also readily effected in an obvious manner.

While the invention has been herein disclosed in what are now considered to be preferred forms of apparatus, it is to be understood that the invention is not restricted to the specific details thereof, but covers all changes, modifications and adaptations within the scope of the appended claims.

I claim as my invention:

1. In combination with an internal combustion engine of the reciprocating piston type, a cylinder head having auxiliary openings extending from the exterior of the engine to the combustion chamber of each cylinder, a removable plug assembly occupying each of said auxiliary openings, said plug assembly being adapted to be inserted in and removed from said openings from the exterior of the engine, and when inserted in said openings providing a readily replaceable catalytic surface exposed within the combustion chamber.

2. In combination with an internal combustion engine of the reciprocating piston type, a cylinder head having auxiliary openings extending from the exterior of the engine to the combustion chamber of each cylinder, a plurality of said openings being provided for each cylinder, a removable plug assembly occupying each of said auxiliary openings, said plug assembly being adapted to be inserted in and removed from said openings from the exterior of the engine, and when inserted in said openings providing a readily replaceable catalytic surface exposed within the combustion chamber.

3. In combination with an internal combustion engine of the reciprocating piston type, a cylinder head having auxiliary openings extending from the exterior of the engine to the combustion chamber of each cylinder, a plurality of said openings being provided for each cylinder, a removable plug assembly occupying each of said auxiliary openings, said plug assembly being adapted to be inserted in and removed from said openings from the exterior of the engine, and when inserted in said openings providing a readily replaceable catalytic surface exposed within the combustion chamber, the amount of catalytic surface provided by said plugs being adjusted so as to dispose within each cylinder from .04 to .16 square inch of oxidizing catalyst surface per cubic inch of piston displacement.

4. In combination with an internal combustion engine of the reciprocating piston type, a cylinder head having auxiliary openings extending from the exterior of the engine to the combustion chamber of each cylinder, a plurality of said openings being provided for each cylinder, a removable plug assembly occupying each of said auxiliary openings, said plug assembly comprising a threaded portion adapted to be threaded into said openings and a catalytic element releasably carried by said threaded portion at the lower end thereof, the entire plug assembly being adapted to be inserted in and removed from said openings from the exterior of the engine, and when inserted in said openings providing a readily replaceable catalytic surface exposed within the combustion chamber.

5. A catalytic element adapted for use with internal combustion engines comprising a core of catalytically inert ceramic material provided with a stop shoulder to permit said core to be positioned within and retained by a retaining sleeve, the lower surface of said ceramic core being provided with an adherent film of catalytically active material which is exposed to the combustion chamber of the engine when said core is in place in said engine.

6. Auxiliary fuel oxidizing means of the catalytic type for use in an internal combustion engine, said auxiliary fuel oxidizing means comprising a removable plug assembly adapted to be inserted from the exterior of the engine and into a bore extending through the engine cylinder head, said plug assembly including a shouldered plug having a slotted face adapted to be exposed within the engine combustion chamber when the plug assembly is positioned within the bore and an insert slide shaped to fit in and to be retained by the slot, said insert slide providing a catalyst surface exposed within the combustion chamber.

7. Auxiliary fuel oxidizing means of the catalytic type for use in an internal combustion engine, said auxiliary fuel oxidizing means comprising a removable plug assembly adapted to be inserted from the exterior of the engine and into a bore extending through the engine cylinder head, said plug assembly including a sleeve, a ceramic core adapted to be mounted in said sleeve and to have a portion extending through said sleeve and into the engine combustion chamber exposing a catalyst surface therein, and a plug adapted to enter said sleeve and to retain the ceramic core therein.

8. Auxiliary fuel oxidizing means of the catalytic type for use in an internal combustion engine, said auxiliary fuel oxidizing means comprising a plug assembly adapted to be inserted from the exterior of the engine and into a bore extending through the engine cylinder head, said plug assembly including an internally shouldered sleeve, a replaceable shouldered ceramic core adapted to be mounted in said sleeve and to have a portion extending through said sleeve and into the engine combustion chamber exposing a catalyst surface therein, shims positioned between the shoulder of said ceramic core and the internal shoulder of said sleeve to adjust the degree of extension of the catalyst surface into the combustion chamber, and a plug adapted to enter said sleeve and to retain the ceramic core therein.

EUGENE J. HOUDRY.

References Cited in the file of this patent

UNITED STATES PATENTS

| Number | Name | Date |
|---|---|---|
| 1,564,906 | Sokal | Dec. 8, 1925 |
| 2,520,378 | Veit | Aug. 29, 1950 |
| 2,552,555 | Houdry | May 15, 1951 |